(12) United States Patent
Miura et al.

(10) Patent No.: US 6,887,060 B2
(45) Date of Patent: May 3, 2005

(54) VOID FILLING DEVICE

(75) Inventors: Kenichi Miura, Inazawa (JP); Akira Yamada, Inazawa (JP)

(73) Assignee: Iida Industry Co., Ltd., Inazawa (JP)

( * ) Notice: Subject to any disclaimer, the term of this patent is extended or adjusted under 35 U.S.C. 154(b) by 2 days.

(21) Appl. No.: 10/180,471

(22) Filed: Jun. 25, 2002

(65) Prior Publication Data

US 2003/0003174 A1 Jan. 2, 2003

(30) Foreign Application Priority Data

Jun. 27, 2001 (JP) ........................................ 2001-194997

(51) Int. Cl.[7] .............................. B32B 1/04; B60R 27/00
(52) U.S. Cl. ........................ 425/110; 296/204; 296/205; 428/319.1; 428/319.3
(58) Field of Search ........................... 428/319.1, 319.3; 296/204, 205; 425/110

(56) References Cited

U.S. PATENT DOCUMENTS

| | | | |
|---|---|---|---|
| 5,591,386 A | * | 1/1997 | Jansen et al. ............... 264/46.9 |
| 6,003,274 A | * | 12/1999 | Wycech ......................... 52/232 |
| 6,092,864 A | * | 7/2000 | Wycech et al. .............. 296/204 |
| 6,233,826 B1 | * | 5/2001 | Wycech ...................... 29/897.1 |
| 6,263,635 B1 | * | 7/2001 | Czaplicki .................... 52/731.6 |
| 6,358,584 B1 | * | 3/2002 | Czaplicki .................... 428/36.5 |
| 6,422,575 B1 | * | 7/2002 | Czaplicki et al. ........... 277/628 |

FOREIGN PATENT DOCUMENTS

| | | | |
|---|---|---|---|
| JP | 1-164641 | 6/1989 | |
| JP | 07-205835 | 8/1995 | ........... B62D/25/04 |
| JP | 10-091170 | 4/1998 | ........... G10K/11/16 |
| JP | 2000-318075 | 11/2000 | ........... B32B/5/18 |
| JP | 2002-073035 | 3/2002 | ........... G10K/11/16 |
| JP | 2002-331960 | 11/2002 | ........... B62D/25/04 |
| WO | 98/36944 | 8/1998 | ........... B60R/13/02 |

* cited by examiner

Primary Examiner—Robert B. Davis
(74) Attorney, Agent, or Firm—Davis & Bujold, P.L.L.C.

(57) ABSTRACT

A void filling device which facilitates insertion of a void filling material into a tubular component and hold of the void filling material therewithin. The device comprises a holder for void filling material which is designed to retain the void filling material to fill a void space by expanding with heat and is of a different material from the void filling material so as to be elastically deformed and inserted into the void space. When the cross-sectional configuration of the void space of the tubular component is a rectangle, the holder is formed into a plate-like configuration which is longer than the diagonal line of the rectangle and is adapted to be insertable into the void space by bending the same arcuately.

6 Claims, 6 Drawing Sheets

VOID FILLING DEVICE

BACKGROUND OF THE INVENTION (i) Field of the Invention

The present invention relates generally to a void filling device, and more particularly to a void filling device comprising a void filling material to fill a void space by expanding with heat and a holder for retaining the void filling material.

(ii) Description of the Related Art

Techniques to improve the noise insulation properties, the damping properties, and the strength by filling the void space inside a car pillar or the like have commonly been used. As described in the Publication of Japanese Unexamined Patent Application No. 1-164641, a void filling material formed by inserting a compressed urethane foam material between two pieces of sheet-like thermosetting foaming material is well known.

The void filling material is adhered to the inner wall of a tubular component, such as a center pillar, before the assembly of the component. Adhesion is achieved by taking advantage of the inherent adhesion of the thermosetting foaming material, or by using an adhesive, a double-faced adhesive tape and the like. According to the description, when the component is heated for drying after being painted, the sheet-like thermosetting foaming material begins to foam and expand.

Since the thermosetting foaming material is gradually softened by the heat and its restraining force to keep the urethane foam in the compressed state is reduced, the original shape of the urethane foam is gradually restored. Then, the urethane foam with the restored shape functions as a core member of the void filling material, which leads the void filling material to expand into a preferred configuration. Thus, the void space inside the center pillar or the like is filled with the expanded thermosetting foaming material and the urethane foam with the restored shape, so that preferred noise insulation properties, damping properties, and the strength can be obtained.

In the prior art described above, the tubular component, such as a center pillar, is formed by butting two members each having a U-shaped cross section and integrating the members by means of welding or the like. The void filling material has been adhered to the flat inner wall of one of the two members prior to the integration of the members However, when the tubular component, such as a center pillar, is formed not by integrating two members but directly from a pipe or the like, there is a problem that it is difficult for the void filling material to be adhered to the inner wall. The same is true with the case where a through hole is formed in a cylindrical blank and the void filling material is fixed within the through hole using a clip or the like.

The object of the present invention is to provide a void filling device, which facilitates insertion of a void filling material into a component having tubular structure and hold of the void filling material therewithin.

SUMMARY OF THE INVENTION

The above object is attained by a void filling device which comprises a void filling material to fill a void space by expanding with heat, retaining means for retaining the void filling material, and elastically deformable means being formed of a different material from that of the void filling material and insertable into the void space by being elastically deformed.

When the cross-sectional configuration of the void space is a rectangle, the void filling device preferably further comprises a plate-like material, which is longer than the diagonal line of the rectangle and includes the retaining means and the elastically deformable means, is adapted to be insertable into the void space by being bent arcuately.

The retaining means may include the surface of the plate-like material, to which the void filling material is attached.

Alternatively, the retaining means may include a hole provided in the plate-like material, and the void filling material is inserted into the hole.

In this case, the retaining means may include a pair of closure plates for retaining the void filling material therebetween, and elastically deformable means may include an elastically deformable portion for interconnecting the pair of closure plates.

Alternatively, the elastically deformable means may include a ring-shaped configuration, and the retaining means include a bar for retaining the void filling material at the approximate center of the ring-shaped configuration.

A major advantage of the device according to the present invention is that even when the tubular component is made of a pipe or the like, the device can easily be inserted into the void space of the component by being elastically deformed and can be held therewithin.

BRIEF DESCRIPTION OF THE DRAWINGS

Preferred embodiments according to the present invention will now be described with reference to the drawings in which.

DETAILED DESCRIPTION OF PREFERRED EMBODIMENTS

Figure 1:
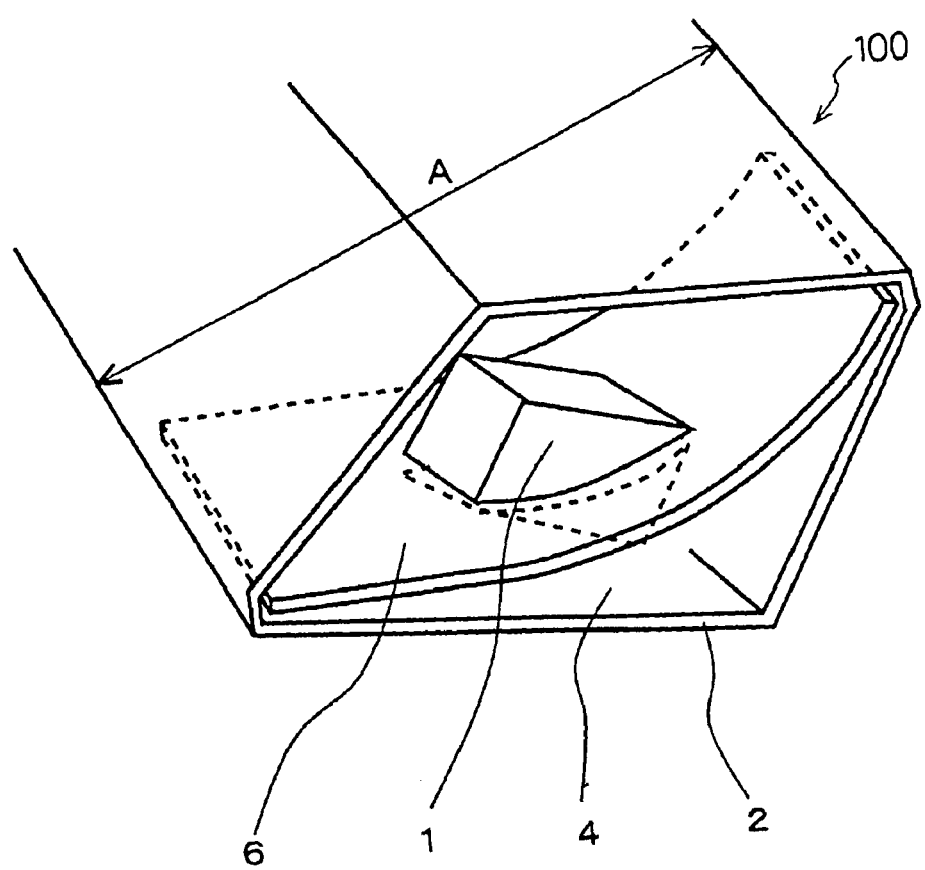
FIG. 1 is a perspective view of a void filling device according to a first embodiment of the present invention, showing the state of the device inserted into a tubular component.

As shown in FIG. 1, a void filling device 100 comprises a void filling material 1 and a holder for void filling material 6. A void filling material 1 is an appropriately combined mixture of a polymer, an inorganic filler, a bridging agent and a foaming agent. The polymer may be, for example, a thermoplastic resin, such as polyolefin, ethylene-vinyl acetate polymer, ethylene propylene rubber and styrene-butadiene rubber.

The inorganic filler may be selected from calcium carbonate, barium sulfate, ferrite and silica. The bridging agent may be peroxide and the like. The foaming agent may be selected from azodicarboneamide, dinitropentamethylene tetramine and the like. The void filling material 1 expands up to about twice to about thirty times as large as the initial state when heated at a temperature between about 140° C. and about 230° C. for about 10 to about 150 minutes.

The void filling material 1 is preferably formed with a size in accordance with the volume of the void space 4 in a tubular component 2, such as a center pillar, such that the void filling material 1 may completely fill the void space 4 once it is caused to foam by the heat. The void filling material 1 is also preferably formed so as to have a cross-sectional configuration similar to that of the void space 4 The tubular component 2 is formed to be tubular from a pipe or the like and has both open ends. Although the cross section of the void space 4 inside the tubular component 2 has a rectangular configuration in the present embodiment, this should not be considered a limitation of the cross-sectional configuration.

The void filling material 1 is retained by a holder for void filling material 6. Specifically, the holder for void filling material 6 in the first embodiment is formed into a rectangular plate-like configuration provided with a through hole at the approximate center thereof. The void filling material 1 is inserted into the through hole and retained such that the void filling material 1 protrudes from both surfaces of the holder for void filling material 6.

Figure 2A:
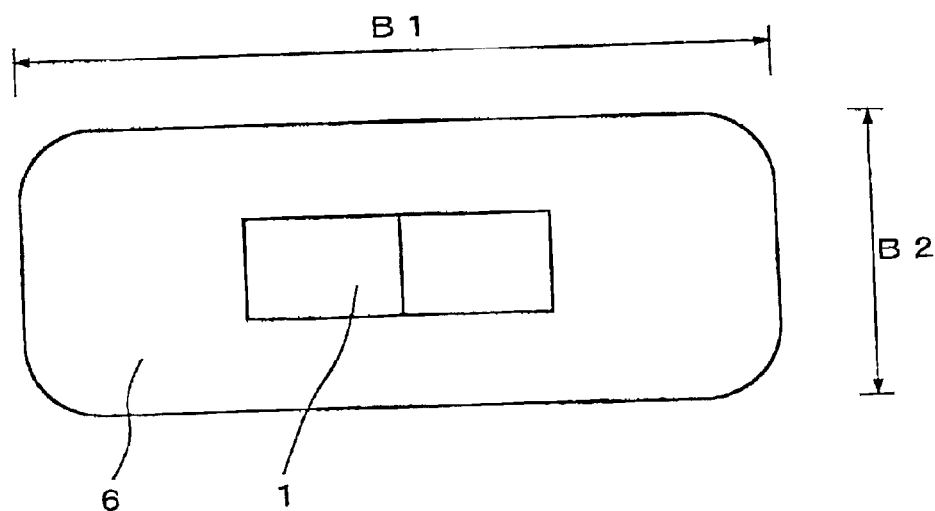
FIGS. 2A and 2B are explanatory views of the void filling device according to the first embodiment.

The length B1, shown in FIG. 2A, of the long side of the holder for void filling material 6 is designed to be greater than the length A of the diagonal line of the void space 4 of the tubular component 2 (B1>A). The size of the void filling material 1 is selected so as to allow the holder for void filling material 6 to be inserted into the void space 4 by elastically deforming the same, as shown in FIG. 1, even when the length B1 is greater than the length A.

When the holder for void filling material 6 is elastically deformed and inserted into the void space 4, the short side of the holder for void filling material 6 comes into contact with the inner wall of the void space 4. Then, the elastic force of the holder for void filling material 6 causes a frictional force between the holder for void filling material 6 and the inner wall The frictional force only needs to be strong enough to prevent the holder for void filling material 6, which retains the void filling material 1, from slipping out of the tubular component 2.

Figure 2B:
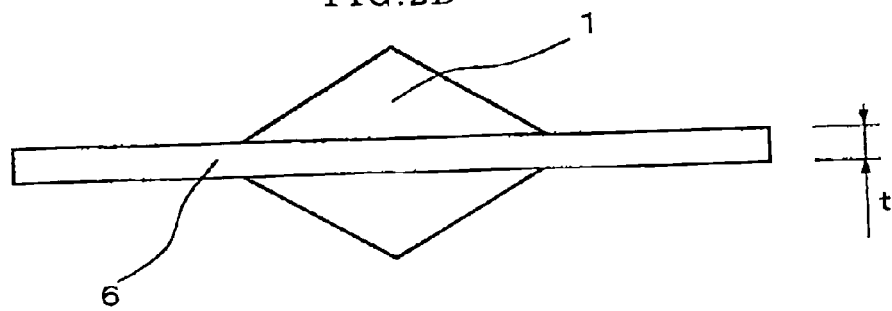

The holder for void filling material 6 is formed such that the elastic force caused by elastically deforming the holder for void filling material 6 when the holder for void filling material 6 is inserted into the void space 4, in turn, may cause the frictional force mentioned above. When the void filling material 1 is heavier, for example, the material for the holder for void filling material 6 is selected so as to have an appropriate elastic coefficient to cause a greater elastic force. The length B2, shown in FIG. 2A, of the short side and the thickness t, shown in FIG. 2B, of the holder for void filling material 6 are also determined so as to cause an appropriate elastic force.

The material for the holder for void filling material 6, which is different from the material for the void filling material 1, may be not only a resin, such as nylon 6-6, but also a metal. In the case where a resin is employed, the resin is required not to soften before the void filling material 1 starts foaming when the heat is applied.

It will now be described how the void filling device in the above described embodiment functions.

As shown in FIG. 1, the holder for void filling material 6 is elastically deformed such that the long side of the holder for void filling material 6 is bent arcuately, then is inserted into the void space 4. The elastic force caused by the elastic deformation, in turn, causes a frictional force between the short sides of the holder for void filling material 6 and the inner walls of the tubular component 2. The frictional force allows the holder for void filling material 6 to be held within the void space 4 of the tubular component 2. As a result, the holder for void filling material 6 is prevented from slipping off when the tubular component 2 is conveyed to a heating furnace or the like.

When the tubular component 2, with which the void filling device 100 holding the void filling material 1 is fitted, is heated at a temperature between about 140° C. and 230° C. for about 10 to about 150 minutes, the void filling material 1 expands up to about twice to about thirty times the volume to fill the void space 4 leaving no space. The void filling material 1 does not slip off during the heating process.

Figure 3:
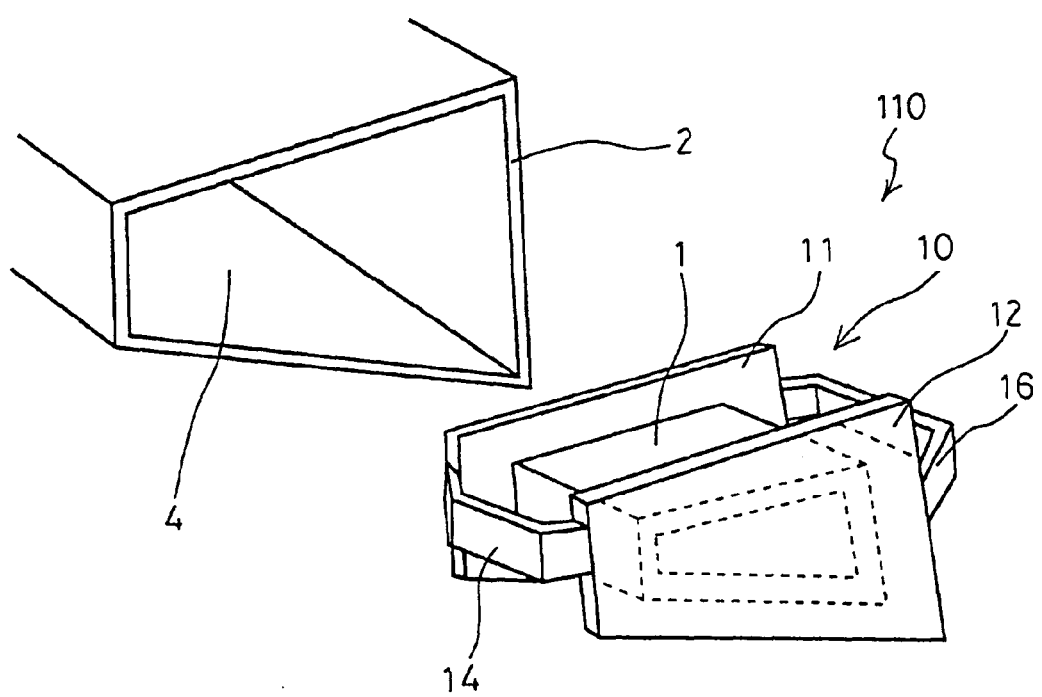
FIG. 3 is a perspective view of a void filling device according to a second embodiment.

A void filling device 110 according to a second embodiment, which is different from the void filling device 100 as above, will now be described with reference to FIG. 3.

The holder for void filling material 10 of the void filling device 110 according to the second embodiment is provided with a pair of closure plates 11 and 12. The pair of closure plates 11 and 12 are formed to have a configuration approximately similar to the cross-sectional configuration of the void space 4. The pair of closure plates 11 and 12 are spaced apart from each other and the void filling material 1 is retained between the pair of closure plates 11 and 12. The void filling material 1 in the second embodiment is formed to have a tubular configuration as indicated by the dashed lines in FIG. 3.

The pair of closure plates 11 and 12 are interconnected with a pair of elastically deformable portions 14 and 16. One end of each of the pair of elastically deformable portions 14 and 16 is connected to one closure plate 11, and the other end is connected to the other closure plate 12. The pair of elastically deformable portions 14 and 16 are configured to protrude outwardly from the closure plates 11 and 12.

The void filling device 110 is designed such that when inserted into the void space 4, the pair of elastically deformable portions 14 and 16 are elastically deformed and the elastic force causes the frictional force between the elastically deformable portions 14 and 16, and the tubular component 2, with the result that the frictional force enables the holder for void filling material 10 retaining the void filling material 1 to be held within the void space 4.

It will now be described how the void filling device 110 according to the second embodiment functions.

First, the void filling device 110 holding the void filling material 1 is inserted into the void space 4. In this case, elastically deformable portions 14 and 16 are elastically deformed, and an elastic force urges the elastically deformable portions 14 and 16 into contact with the inner walls of the tubular component 2. Then, the frictional force caused by the elastic force enables the holder for void filling material 10 to be held within the void space 4.

Subsequently, the tubular component 2 is heated in a heating furnace, and the void filling material 1 foams. During the heating process, the void filling material 1 retained by the pair of closure plates 11 and 12 does not fall off but fill the space between the pair of closure plates 11 and 12. In other words, the void filling device 110 according to the second embodiment also enables only the limited space between the pair of closure plates 11 and 12 to be filled.

Figure 4:
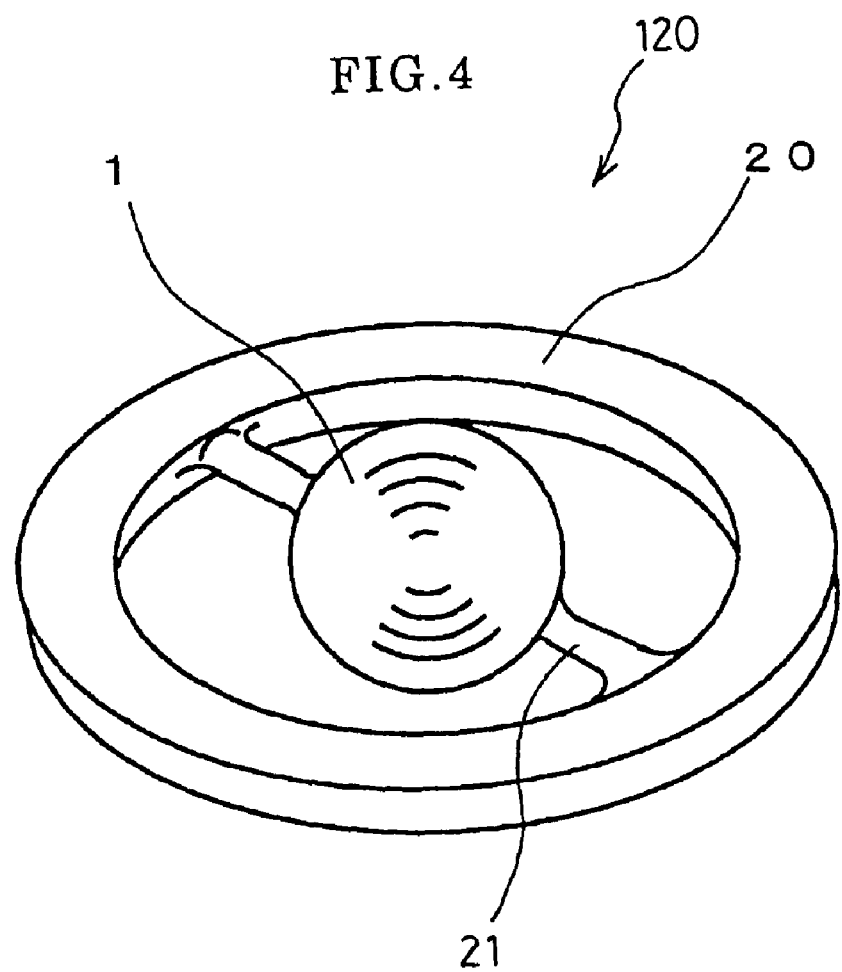
FIG. 4 is a perspective view of a void filling device according to a third embodiment.

Alternatively, the void filling device 120 according to a third embodiment, as shown in FIG. 4, comprises an elastically deformable ring 20 and a diametrically extending bar 21 for retaining the void filling material 1 at the approximate center of the ring.

Figure 5A:
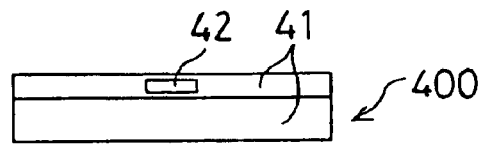
FIGS. 5A, 5B and 5C are a plan view, a front view and a right side view, respectively, of a void filling device according to a fourth embodiment.
Figure 5B:
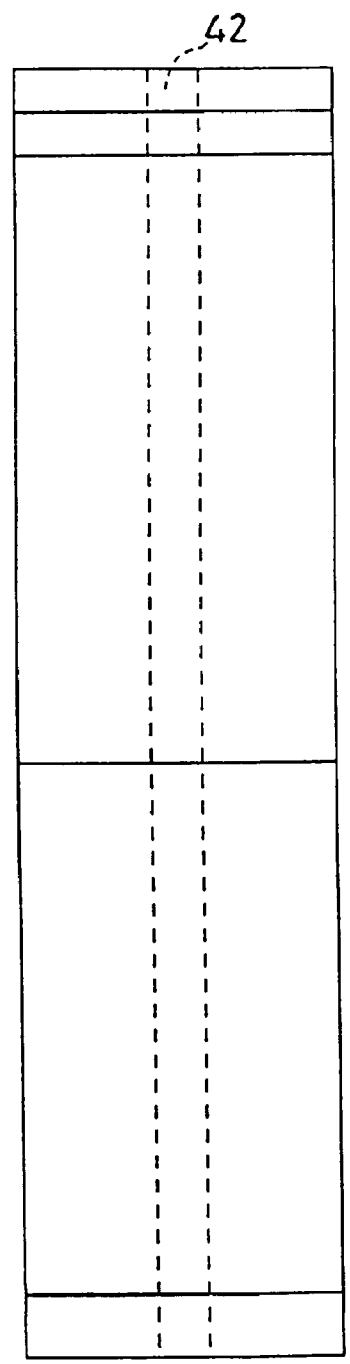
Figure 5C:
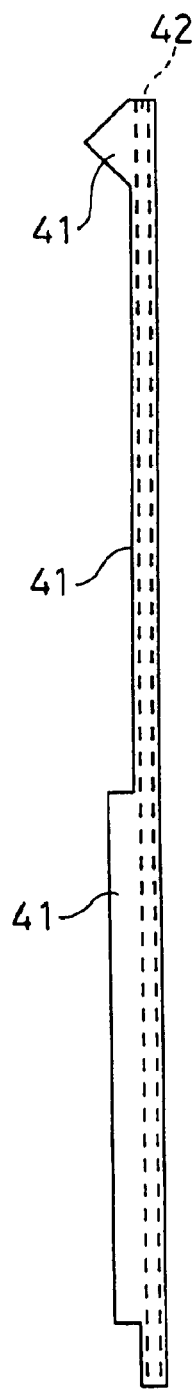

In a void filling device 400 according to a fourth embodiment, shown in FIGS. 5A, 5B and 5C, a void filling material 41 and a holder for void filling material 42 are integrated. Specifically, the void filling material 41 is retained such that the void filling material 41 is attached to or covering the entire surface of the holder for void filling material 42, which has a considerably small volume (about ⅕ to about 1/20) compared with the volume of the void filling material 41. Although the void filling material 41 of this embodiment comprises a triangular cross-section portion 41*a* at one end, a central thinner portion 41*b* and a subsequent thicker portion 41*c*, the void filling material 41 may have a suitable configuration in accordance with the shape of the void space in the pillar to be filled.

Figure 6A:
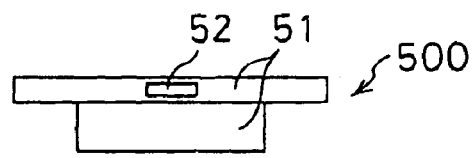
FIGS. 6A, 6B and 6C are a plan view, a front view and a right side view, respectively, of a void filling device according to a modification of the fourth embodiment.
Figure 6B:
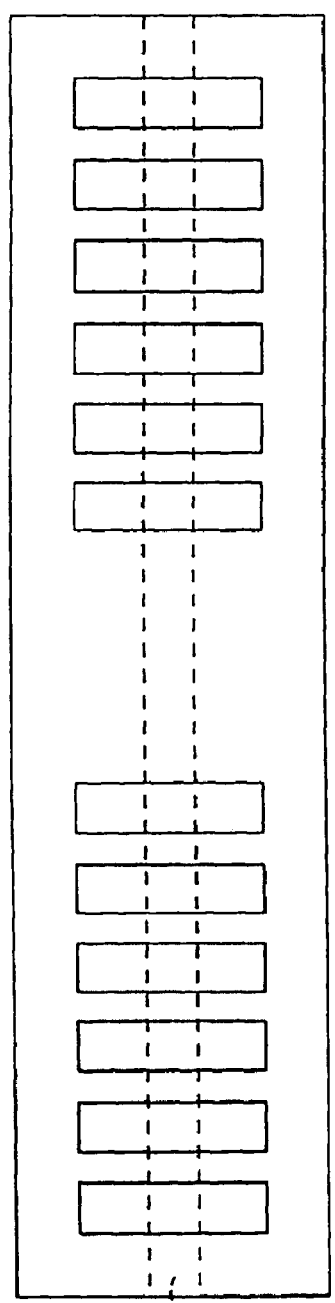
Figure 6C:
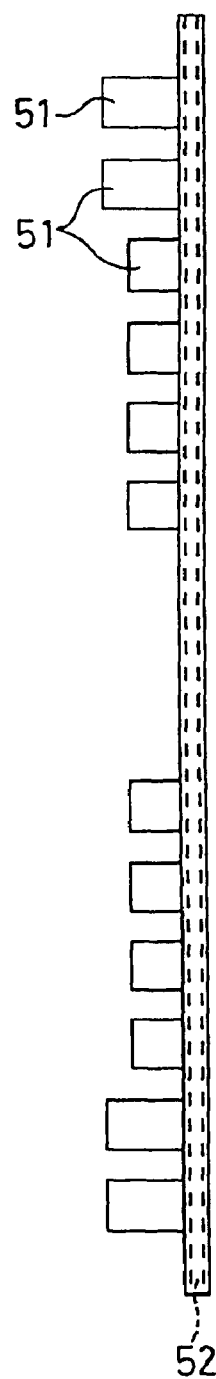

In a void filling device 500 according to a modification of the fourth embodiment, shown in FIGS. 6A, 6B and 6C, a void filling material 51 comprises a plurality of island-shaped portions having different thicknesses, respectively. The void filling material 51 is integrated, as in the above fourth embodiment, with a holder for void filling material 52, which has a considerably small volume (about ⅕ to about 1/20) compared with the volume of the void filling material 51.

It is to be understood that the present invention should not be limited to the above described embodiments, but may be embodied in various forms without departing from the spirit of the present invention.

What is claimed is:

1. A void filling device, comprising:
   a void filling material to fill a void space by expanding with heat;
   retaining means for retaining said void filling material;
   elastically deformable means being formed of a different material from that of said void filling material and insertable into the void space by being elastically deformed;
   a cross-sectional configuration of the void space being a rectangle, said void filling device further comprises a plate-like material which is longer than a diagonal line of the rectangle, said plate-like material including said retaining means and said elastically deformable means and being adapted to be insertable into the void space by being bent arcuately; and
   said retaining means includes a hole provided in said plate-like material and said void filling material is inserted into the hole.

2. The void filling device according to claim 1, wherein said retaining means includes the surface of said plate-like material and said void filling material is attached to said surface.

3. A void filling device, comprising:
   a void filling material to fill a void space by expanding with heat;
   retaining means for retaining said void filling material;
   elastically deformable means being formed of a different material from that of said void filling material and insertable into the void space by being elastically deformed; and
   said retaining means includes a pair of closure plates for retaining the void filling material therebetween, and said elastically deformable means includes an elastically deformable portion for interconnecting said pair of closure plates.

4. The void filling device according to claim 3, wherein said retaining means includes the surface of said plate-like material and said void filling material is attached to said surface.

5. A void filling device, comprising:
   a void filling material to fill a void space by expanding with heat;
   retaining means for retaining said void filling material;
   elastically deformable means being formed of a different material from that of said void filling material and insertable into the void space by being elastically deformed; and
   said elastically deformable means includes a ring-shaped configuration and said retaining means includes a bar for retaining said void filling material at the approximate center of said ring-shape configuration.

6. The void filling device according to claim 5, wherein said retaining means includes the surface of said plate-like material and said void filling material is attached to said surface.

* * * * *